United States Patent
Parusel et al.

(10) Patent No.: US 7,602,550 B2
(45) Date of Patent: *Oct. 13, 2009

(54) STABLE REAR PROJECTION SCREEN AND METHOD FOR THE PRODUCTION THEREOF

(75) Inventors: Markus Parusel, Messel (DE); Jann Schmidt, Rockaway, NJ (US); Herbert Groothues, Weiterstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 486 days.

This patent is subject to a terminal disclaimer.

(21) Appl. No.: 10/566,370

(22) PCT Filed: Mar. 12, 2004

(86) PCT No.: PCT/EP2004/002627

§ 371 (c)(1),
(2), (4) Date: Jan. 30, 2006

(87) PCT Pub. No.: WO2005/092654

PCT Pub. Date: Oct. 6, 2005

(65) Prior Publication Data

US 2008/0158670 A1   Jul. 3, 2008

(30) Foreign Application Priority Data

Aug. 4, 2003   (DE) ................. 103 36 131

(51) Int. Cl.
G03B 21/60   (2006.01)
G03B 21/56   (2006.01)

(52) U.S. Cl. ...................... 359/453; 359/460

(58) Field of Classification Search ......... 359/452–453, 359/460
See application file for complete search history.

(56) References Cited

U.S. PATENT DOCUMENTS

| 4,859,027 | A | 8/1989 | Kishida | 359/455 |
|---|---|---|---|---|
| 5,457,572 | A * | 10/1995 | Ishii et al. | 359/457 |
| 6,400,504 | B2 * | 6/2002 | Miyata | 359/453 |
| 6,411,436 | B1 | 6/2002 | Kikuchi | 359/460 |
| 6,760,155 | B2 * | 7/2004 | Murayama et al. | 359/453 |
| 7,339,732 | B2 * | 3/2008 | Parusel et al. | 359/453 |
| 2004/0257650 | A1 | 12/2004 | Parusel et al. | |
| 2005/0084993 | A1 | 4/2005 | Schmidt et al. | |

FOREIGN PATENT DOCUMENTS

| EP | 0 162 408 | 11/1985 |
|---|---|---|
| EP | 0 561 551 | 9/1993 |
| EP | 0 930 526 | 7/1999 |
| EP | 1 152 286 | 11/2001 |
| JP | 7-234304 | 9/1995 |
| JP | 11-179856 | 7/1999 |
| WO | 98/45753 | 10/1998 |
| WO | 02/057850 | 7/2002 |

* cited by examiner

*Primary Examiner*—Christopher Mahoney
(74) *Attorney, Agent, or Firm*—Oblon, Spivak, McClelland, Maier & Neustadt, L.L.P.

(57) ABSTRACT

The present invention relates to rear-projection screens which have at least one scattering layer encompassing scattering particles and has at least one backing layer, characterized in that the halved-intensity angle of the scattering layer is greater than or equal to 15° and the halved-intensity angle of the backing layer is smaller than or equal to 6.5°, where the gloss $R_{60°}$ of the backing layer is smaller than or equal to 70.

27 Claims, 1 Drawing Sheet

STABLE REAR PROJECTION SCREEN AND METHOD FOR THE PRODUCTION THEREOF

BACKGROUND OF THE INVENTION

1. Field of the Invention

The present invention relates to stable rear-projection screens which encompass at least one light-scattering polymethyl methacrylate layer, and to processes for producing these rear-projection screens.

2. Description of the Related Art

Using the technique of rear projection, information can be made available to a wide audience. In principle, the structure of this type of system is composed of an image surface which is illuminated from the rear by a projector and thus provides the information.

Examples of the use of this technique are found in control rooms (power stations, railways), where they make it easier for those responsible to gain an overview of the complex processes, thus permitting avoidance of control errors. Another application is given by display panels in, for example, sports stadia and at motor-racing events. Here, the spectators are given information about progress and events as they occur, even if they are very distant from the action itself.

These image surfaces are very large. Continual technical advances (projector technology) have added other fields of application over the years.

For example, this type of information provision is also used in, for example, TV equipment, large-scale cinemas and home cinemas, and as a promotional medium at exhibitions, in window displays, and in shops.

This technique is moreover also used to provide information during presentations and in flight simulators, where the virtual environment is depicted on the cockpit screen with maximum simulation of reality.

A source of many advantages of this technique is that the projector is outside the viewing space. This means that projection is not interrupted by any observer located in front of the projection surface, and distracting noises from the projector are eliminated, and the room can be attractively designed.

There is now a wide variety of plastic sheets and foils which are used in rear-projection technology. Sheets are often modified to give them defined surface structures in the form of Fresnel lens systems on the rear side and also vertically arranged lenticular lenses on the observer side. The production of these rear-projection panels is therefore expensive. The surface structures can moreover be very sensitive to mechanical load. Damage causes very great impairment of the appearance of the projected image.

There are also known rear-projection sheets and films which comprise scattering media, these sheets comprising particles whose refractive index differs from that of the matrix. The sheets and films are likewise suitable for rear projection, but each does not cover the entire range of requirements, and therefore only some of the requirements placed upon a screen are met.

Because of the large number of different possible uses, a very wide variety of requirements are placed upon the projection surface. By way of example, in one application the projection surfaces have to provide a very steady, clear and high-resolution reproduction of the image, because the observer here has to take in the information over a prolonged period (example: control rooms, home cinema, etc.).

When these projection surfaces are used for presentation and promotional purposes, for example on exhibition stands, the surfaces then have to be particularly resistant to mechanical load and soiling, while the requirements for projection quality are not so high.

By way of example, known scattering media, such as barium sulphate and titanium dioxide, can be used to produce sheets and films which have a high light-scattering angle.

There are also known screens which comprise plastics particles as scattering media. For example, document JP 07234304 describes a mixture composed of crosslinked acrylate-styrene beads (14 μm) in a transparent plastic.

A disadvantage of the rear-projection screens described above is that their mechanical stability is dependent on the thickness of the light-scattering layer, particularly high picture sharpness being improved via a relatively thin light-scattering layer.

On the other hand, there are also known multilayer rear-projection screens which have an additional backing layer alongside the light-scattering layer, so that even relatively large screens have adequate mechanical stability. Screens of this type are capable of self-supporting attachment within a room, e.g. via fastening to the ceiling. By way of example, this permits effective provision of films or advertising material via rear-projection technology at exhibitions or in showrooms.

By way of example, multilayer rear-projection screens are disclosed in JP 11179856, EP-A-0 561 551, WO 98/45753 and U.S. Pat. No. 6,411,436. The document WO 98/45753 describes rear-projection screens which have a scattering layer, a diffusion layer, and also a plastics substrate. According to FIG. 6, the diffusion layer may also have been arranged on that surface of the substrate which is opposite to the scattering layer. However, the relatively poor imaging performance of this type of structure is problematic, and this is even indicated in the document itself.

The publication U.S. Pat. No. 6,411,436 describes rear-projection screens which have a neutral grey layer. This is a coloured layer which according to U.S. Pat. No. 6,411,436 is intended to improve imaging performance. However, when this structure is copied no such advantage is apparent. The gloss of this neutral grey layer is not described.

The Japanese laid-open specification JP 11179856 describes multilayer sheets with at least one layer which encompasses a polymethyl methacrylate matrix, and also encompasses crosslinked polymethyl methacrylate beads as scattering/matting agent, the proportion of the beads being in the range from 0.5 to 25% by weight.

The publication EP-A-0 561 551 describes a multilayer sheet with a scattering layer composed of a mixture of a transparent polymer and spherical particles (2-15 μm).

A disadvantage of rear-projection screens with a backing layer which, by way of example, is self-supporting and attached to a ceiling and is illuminated from the rear is that this results in undesirable reflection images in the room, these having an adverse optical effect.

In addition, known rear-projection screens provided with scattering media often have non-ideal imaging properties. In particular, the known screens have relatively low picture sharpness or relatively disadvantageous brightness distribution. In addition, there are problems with colour accuracy. Furthermore, many screens do not meet mechanical requirements, scratches in particular having a disadvantageous optical effect.

SUMMARY OF THE INVENTION

In the light of the prior art discussed and stated herein, an object of the present invention was therefore to provide stable rear-projection screens which do not exhibit any undesired reflection images in the room. These screens should permit particularly high picture quality, in particular high picture sharpness and resolution of the projected picture.

In addition, the images on the rear-projection screens should have particularly good colour accuracy.

Another object of the invention consisted in providing rear-projection screens which have particularly uniform brightness distribution.

In addition, the rear-projection screens should have maximum mechanical stability. Scratches on the screen here should be invisible or only very slightly visible. In particular, damage should have no, or only very slight, effect on the imaging capability of the screen.

A further object on which the invention was based was to provide rear-projection screens which are capable of particularly simple production. The rear-projection screens should therefore in particular be capable of production via extrusion.

In addition, it was therefore an object of the present invention to provide rear-projection screens which have high picture steadiness. The material presented can therefore be viewed for a long period without fatigue.

Another object of the present invention consisted in providing rear-projection screens whose size and shape can easily be adapted to requirements.

In addition, the images on the rear-projection screens should have particularly good contrast.

Another object of the invention consisted in providing rear-projection screens with high durability, in particular high resistance to UV irradiation or weathering.

Another object on which the present invention was based was to provide rear-projection screens whose imaging properties involve only very little reflection.

The rear-projection screens of the invention achieve these objects, and also achieve other objects which, although they are not specifically mentioned, are obvious or necessary consequences of the circumstances discussed herein.

The underlying object with respect to the processes for producing rear-projection screens is also achieved.

DETAILED DESCRIPTION OF THE INVENTION

Figure 1:
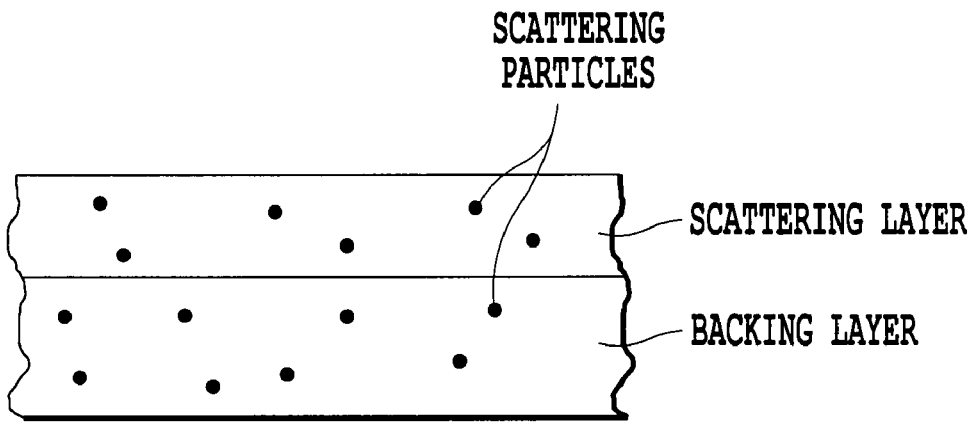
FIG. 1. A rear-projection screen with a scattering layer and a backing layer. The scattering and backing layers comprise scattering particles.
Figure 2:
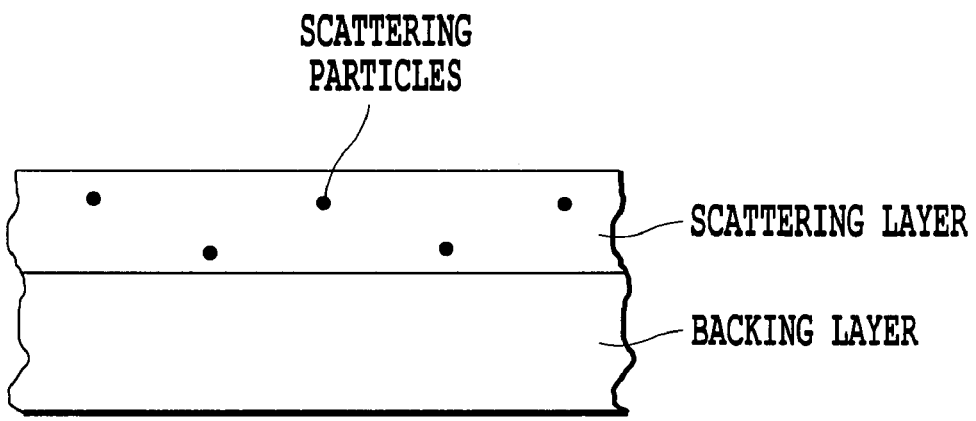
FIG. 2. A rear-projection screen with a scattering layer and a backing layer. The scattering layer comprises scattering particles.

Rear-projection screens which encompass at least one scattering layer encompassing scattering particles and encompass at least one backing layer, and which permit a very low level of reflection of the projected picture in the room, together with high stability and good picture quality can be successfully provided if the halved-intensity angle of the scattering layer is greater than or equal to 15° and the halved-intensity angle of the backing layer is smaller than or equal to 6.5°, where the gloss $R_{60°}$ of the backing layer is smaller than or equal to 70.

The inventive measures achieve, inter alia, in particular the following advantages:

The rear-projection screens of the present invention permit high picture sharpness and resolution of the projected picture.

The image on the inventive rear-projection screens has particularly good colour accuracy and particularly good contrast.

The rear-projection screens provided according to the present invention have particularly uniform brightness distribution.

In addition, the rear-projection screens of the present invention exhibit high mechanical stability. Scratches on the screen here are invisible or only very slightly visible.

Furthermore, pictures projected onto the inventive rear-projection screens have high picture steadiness. The material presented can therefore be viewed over a long period without fatigue.

Furthermore, the present invention can reduce the level of reflections of the reflected picture in the room.

In addition, the rear-projection screens of the present invention exhibit a non-glossy, matt surface profile. The nature of the surface structure can be adjusted, where appropriate, without affecting the optical parameters other than gloss. The level of reflections adversely affecting the image on the screen can thus be reduced.

The rear-projection screens of the present invention are moreover capable of particularly simple production. In these, the rear-projection screens can in particular be produced via extrusion.

The inventive rear-projection sheets exhibit high resistance to weathering, in particular to UV irradiation.

The size and shape of the rear-projection screens can be adapted to requirements.

The rear-projection screen encompasses a backing layer which generally comprises plastics with excellent optical properties.

Among these plastics are in particular polycarbonates, cycloolefinic polymers and poly(meth)acrylates, preference being given to poly(meth)acrylates.

Polycarbonates are known to persons skilled in the art. Formally, polycarbonates may be regarded as polyesters composed of carbonic acid and of aliphatic or aromatic dihydroxy compounds. They are readily obtainable via reaction of diglycols or bisphenols with phosgene or with carbonic diesters in polycondensation and, respectively, transesterification reactions.

Preference is given here to polycarbonates which derive from bisphenols. Among these bisphenols are in particular 2,2-bis(4-hydroxyphenyl)propane (bisphenol A), 2,2-bis(4-hydroxyphenyl)butane (bisphenol B), 1,1-bis(4-hydroxyphenyl)cyclohexane (bisphenol C), 2,2'-methylenediphenol (bisphenol F), 2,2-bis(3,5-dibromo-4-hydroxyphenyl)propane (tetrabromobisphenol A) and 2,2-bis(3,5-dimethyl-4-hydroxyphenyl)propane (teramethylbisphenol A).

Aromatic polycarbonates of this type are usually prepared via interfacial polycondensation or via transesterification, a detailed description being given in Encycl. Polym. Sci. Engng. 11, 648-718.

In interfacial polycondensation, the bisphenols are emulsified in the form of an aqueous, alkaline solution in inert organic solvents, such as methylene chloride, chlorobenzene or tetrahydrofuran, and are reacted in stages with phosgene. Catalysts used comprise amines, or in the case of sterically hindered bisphenols also phase-transfer catalysts. The resultant polymers are soluble in the organic solvents used.

The properties of the polymers can be varied widely via the selection of the bisphenols. If simultaneous use is made of different bisphenols, it is also possible to build up block polymers in multistage polycondensation reactions.

Cycloolefinic polymers are polymers which are obtainable by using cyclic olefins, in particular polycyclic olefins.

Cyclic olefins encompass, for example, monocyclic olefins, such as cyclopentene, cyclopentadiene, cyclohexene, cycloheptene, cyclooctene, and also alkyl derivatives of these monocyclic olefins having from 1 to 3 carbon atoms, examples being methyl, ethyl or propyl, e.g. methylcyclohexene or dimethylcyclohexene, and also acrylate and/or methacrylate derivatives of these monocyclic compounds. Furthermore, cycloalkanes having olefinic side chains may also be used as cyclic olefins, an example being cyclopentyl methacrylate.

Preference is given to bridged polycyclic olefin compounds. These polycyclic olefin compounds may have the double bond either in the ring, in which case they are bridged polycyclic cycloalkenes, or else in side chains. In that case they are vinyl derivatives, allyloxycarboxy derivatives or (meth)acryloxy derivatives of polycyclic cycloalkane compounds. These compounds may also have alkyl, aryl or aralkyl substituents.

Without any intended resultant restriction, examples of polycyclic compounds are bicyclo[2.2.1]hept-2-ene (norbornene), bicyclo[2.2.1]hept-2,5-diene (2,5-norbornadiene), ethylbicyclo[2.2.1]hept-2-ene (ethylnorbornene), ethylidenebicyclo[2.2.1]hept-2-ene (ethylidene-2-norbornene), phenylbicyclo[2.2.1]hept-2-ene, bicyclo[4.3.0]nona-3,8-diene, tricyclo[4.3.0.1$^{2,5}$]-3-decene, tricyclo[4.3.0.1$^{2,5}$]-3,8-decene (3,8-dihydrodicyclopentadiene), tricyclo[4.4.0.1$^{2,5}$]-3-undecene, tetracyclo[4.4.0.1$^{2,5}$.1$^{7,10}$]-3-dodecene, ethylidenetetracyclo[4.4.0.1$^{2,5}$.1$^{7,10}$]-3-dodecene, methyloxycarbonyltetracyclo[4.4.0.1$^{2,5}$.1$^{7,10}$]-3-dodecene, ethylidene-9-ethyltetracyclo[4.4.0.1$^{2,5}$.1$^{7,10}$]-3-dodecene, pentacyclo[4.7.0.1$^{2,5}$,0,0$^{3,13}$.1$^{9,12}$]-3-pentadecene, pentacyclo[6.1.1$^{3,6}$.0$^{2,7}$.0$^{9,13}$]-4-pentadecene, hexacyclo[6.6.1.1$^{3,6}$.1$^{10,13}$.0$^{2,7}$.0$^{9,14}$]-4-heptadecene, dimethylhexacyclo[6.6.1.1$^{3,6}$.1$^{10,13}$.0$^{2,7}$.0$^{9,14}$]-4-heptadecene, bis(allyloxycarboxy)tricyclo[4.3.0.1$^{2,5}$]decane, bis(methacryloxy)tricyclo[4.3.0.1$^{2,5}$]decane, bis(acryloxy)tricyclo[4.3.0.1$^{2,5}$]decane.

The cycloolefinic polymers are prepared using at least one of the cycloolefinic compounds described above, in particular the polycyclic hydrocarbon compounds. The preparation of the cycloolefinic polymers may, furthermore, use other olefins which can be copolymerized with the abovementioned cycloolefinic monomers. Examples of these are ethylene, propylene, isoprene, butadiene, methylpentene, styrene, and vinyltoluene.

Most of the abovementioned olefins, and in particular the cycloolefins and polycycloolefins, may be obtained commercially. Many cyclic and polycyclic olefins are moreover obtainable by Diels-Alder addition reactions.

The cycloolefinic polymers may be prepared in a known manner, as set out inter alia in the Japanese Patent Specifications 11818/1972, 43412/1983, 1442/1986 and 19761/1987 and in the published Japanese Patent Applications Nos. 75700/1975, 129434/1980, 127728/1983, 168708/1985, 271308/1986, 221118/1988 and 180976/1990 and in the European Patent Applications EP-A-0 6 610 851, EP-A-0 6 485 893, EP-A-0 6 407 870 and EP-A-0 6 688 801.

The cycloolefinic polymers may, for example, be polymerized in a solvent, using aluminium compounds, vanadium compounds, tungsten compounds or boron compounds as catalyst.

It is assumed that, depending on the conditions, in particular on the catalyst used, the polymerization can proceed with ring-opening or with opening of the double bond.

It is also possible to obtain cycloolefinic polymers by free-radical polymerization, using light or an initiator as free-radical generator. This applies in particular to the acryloyl derivatives of the cycloolefins and/or cycloalkanes. This type of polymerization may take place either in solution or else in bulk.

Another preferred plastic encompasses poly(meth)acrylates. These polymers are generally obtained by free-radical polymerization of mixtures which comprise (meth)acrylates. The term (meth)acrylates encompasses methacrylates and acrylates, and also mixtures of the two.

These monomers are well known. Among them are, inter alia, (meth)acrylates derived from saturated alcohols, e.g. methyl(meth)acrylate, ethyl(meth)acrylate, propyl(meth)acrylate, n-butyl(meth)acrylate, tert-butyl (meth)acrylate, pentyl(meth)acrylate and 2-ethylhexyl(meth)acrylate;

(meth)acrylates derived from unsaturated alcohols, e.g. oleyl (meth)acrylate, 2-propynyl(meth)acrylate, allyl(meth)acrylate, vinyl(meth)acrylate;

aryl(meth)acrylates, such as benzyl(meth)acrylate or phenyl (meth)acrylate, where each of the aryl radicals may be unsubstituted or have up to four substituents; cycloalkyl (meth)acrylates, such as 3-vinylcyclohexyl (meth)acrylate, bornyl(meth)acrylate;

hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate;

glycol di(meth)acrylates, such as 1,4-butanediol di(meth)acrylate, (meth)acrylates of ether alcohols, such as tetrahydrofurfuryl(meth)acrylate, vinyloxyethoxyethyl(meth)acrylate;

amides and nitriles of (meth)acrylic acid, e.g. N-(3-dimethylaminopropyl)(meth)acrylamide, N-(diethylphosphono)(meth)acrylamide, 1-methacryloylamido-2-methyl-2-propanol;

sulphur-containing methacrylates, such as ethylsulphinylethyl(meth)acrylate, 4-thiocyanatobutyl(meth)acrylate, ethylsulphonylethyl(meth)acrylate, thiocyanatomethyl (meth)acrylate, methylsulphinylmethyl(meth)acrylate, bis ((meth)acryloyloxyethyl) sulphide; multifunctional (meth)acrylates, such as trimethylolpropane tri(meth)acrylate, pentaerythritol tetra(meth)acrylate and pentaerythritol tri(meth)acrylate.

According to one preferred aspect of the present invention, these mixtures comprise at least 40% by weight, preferably at least 60% by weight, and particularly preferably at least 80% by weight, of methyl methacrylate, based on the weight of the monomers.

Besides the (meth)acrylates set out above, the compositions to be polymerized may also comprise other unsaturated monomers which are copolymerizable with methyl methacrylate and with the abovementioned (meth)acrylates.

Examples of these are 1-alkenes, such as 1-hexene, 1-heptene; branched alkenes, such as vinylcyclohexane, 3,3-dimethyl-1-propene, 3-methyl-1-diisobutylene, 4-methyl-1-pentene;

acrylonitrile; vinyl esters, such as vinyl acetate;

styrene, substituted styrenes having one alkyl substituent in the side chain, e.g. α-methylstyrene and α-ethylstyrene, substituted styrenes having one alkyl substituent on the ring, e.g. vinyltoluene and p-methylstyrene, halogenated styrenes, such as monochlorostyrenes, dichlorostyrenes, tribromostyrenes, and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidone, 3-vinyl-pyrrolidine, N-vinylcaprolactam, N-vinylbutyrolactam, vinyloxolane, vinylfuran, vinylthiophene, vinylthiolane, vinylthiazoles, and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and the compounds here may be used individually or as a mixture.

The polymerization is generally initiated by known free-radical initiators. Among the preferred initiators are, inter alia, the azo initiators well known to persons skilled in the art, e.g. AIBN and 1,1-azobiscyclohexanecarbonitrile, and also peroxy compounds, such as methyl ethyl ketone peroxide, acetylacetone peroxide, dilauroyl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butylperoxy 2-ethylhexanoate, tert-butylperoxy 3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl)peroxydicarbonate, mixtures of two or more of the abovementioned compounds with one another, and also mixtures of the abovementioned compounds with compounds not mentioned which can likewise form free radicals.

The amount often used of these compounds is from 0.01 to 3% by weight, preferably from 0.05 to 1% by weight, based on the weight of the monomers.

The abovementioned polymers may be used individually or as a mixture. Use may also be made here of various polycarbonates, poly(meth)acrylates or cycloolefinic polymers which differ, for example, in molecular weight or in monomer composition.

The inventive backing layers may, for example, be produced from moulding compositions of the abovementioned polymers. For this, use is generally made of thermoplastic shaping processes, such as extrusion or injection moulding.

The weight-average molar mass $M_w$ of the homo- and/or copolymers to be used according to the invention as moulding compositions for producing the backing layers may vary within a wide range, the molar mass usually being matched to the application and the method used for processing the moulding composition. However, with no intended resultant restriction, it is generally in the range from 20 000 to 1 000 000 g/mol, preferably from 50 000 to 500 000 g/mol, and particularly preferably from 80 000 to 300 000 g/mol. An example of a method for determining this variable is gel permeation chromatography.

The backing layer may also be produced by cell casting processes. In these, by way of example, suitable (meth)acrylic mixtures are charged to a mould and polymerized. These (meth)acrylic mixtures generally comprise the (meth)acrylates set out above, in particular methyl methacrylate. The (meth)acrylic mixtures may moreover comprise the copolymers set out above, and also, in particular for viscosity adjustment, may comprise polymers, in particular poly(meth)acrylates.

The weight-average molar mass $M_w$ of the polymers prepared by cell casting processes is generally higher than the molar mass of polymers used in moulding compositions. This gives a number of known advantages. With no intended resultant restriction, the weight-average molar mass of polymers prepared by cell casting processes is generally from 500 000 to 10 000 000 g/mol.

Preferred backing layers produced by the cell casting process may be obtained commercially from Röhm GmbH & Co. KG.

The moulding compositions used to produce the backing layers, and also the acrylic resins, may also comprise conventional additives of any type. Examples of these are antistatic agents, antioxidants, mould-release agents, flame retardants, lubricants, dyes, flow improvers, fillers, light stabilizers and organophosphorus compounds, such as phosphites, phosphorinanes, phospholanes or phosphonates, pigments, weathering stabilizers and plasticizers. However, the amount of additives is restricted in relation to the application. The optical properties of the plastics, in particular their transparency, should therefore not be excessively impaired by additives.

Particularly preferred moulding compositions which encompass poly(meth)acrylates are obtainable commercially with the trade name Acrylite® from the company Cyro Inc., USA. Preferred moulding compositions which encompass cycloolefinic polymers may be purchased with the trade name ®Topas from Ticona and ®Zeonex from Nippon Zeon. Polycarbonate moulding compositions are obtainable, by way of example, with the trade name ®Makrolon from Bayer or ®Lexan from General Electric.

The backing layer particularly preferably encompasses at least 80% by weight, in particular at least 90% by weight, based on the total weight of the backing layer, of poly(meth)acrylates, polycarbonates and/or cycloolefinic polymers. The backing layers are particularly preferably composed of polymethyl methacrylate, and this polymethyl methacrylate may comprise conventional additives.

The gloss $R_{60°}$ of the backing layer measured at an angle of 60° is smaller than or equal to 70, preferably smaller than or equal to 60, in particular smaller than or equal to 40, particularly preferably smaller than or equal to 30 and very particularly preferably smaller than or equal to 15.

This very low gloss of the backing layer may be produced by various processes.

If the backing layer is produced via casting processes, use may be made of a structured glass sheet. Glass sheets of this type may be produced by etching. This gives the cast sheet produced very low gloss, which decreases with increasing etching of the glass sheet.

If the backing layer is produced via extrusion, use may be made of a roll which encompasses a structured surface. Furthermore, a structured paper may be arranged between polishing roll and extruded sheet. The gloss of the surface produced in this way becomes lower as the amount of structuring of the roll or of the paper increases.

In addition, a film may be laminated onto a smooth plastics sheet in order to produce an appropriate surface structure. The backing layer may correspondingly have a multilayer structure.

The backing layer may moreover comprise plastics particles whose size in the range from 20 to 100 μm and whose refractive index is the same as, or is only very slightly different from, that of the plastic of the backing layer. Gloss reduces as the proportion of these plastics particles increases.

Furthermore, a relatively thin gloss-reduction layer comprising a relatively high proportion of scattering particles may be applied to the backing layer, for example via coextrusion or lamination.

The concentration of the scattering particles in the relatively thin gloss-reduction layer is preferably in the range from 0.5 to 20% by weight, with preference in the range from 0.5 to 10% by weight and particularly preferably in the range from 0.5 to 6% by weight, the median size $V_{50}$ of the scattering particles used preferably being smaller than or equal to 150 μm, in particular smaller than or equal to 100 μm, particularly preferably smaller than or equal to 50 μm and very particularly preferably smaller than or equal to 30 μm. The thickness of the thin gloss-reduction layer may in particular be in the range from 10 to 500 μm, preferably in the range from 20 to 250 μm and very particularly preferably in the range from 50 to 150 μm.

According to one particular embodiment of the present invention, the average surface roughness $R_Z$ of the surface of the backing layer is preferably in the range which is preferably from 2 to 45 μm, in particular from 3 to 40 μm, with preference from 5 to 35 μm. These values are measured on that surface of the backing layer which is opposite to the scattering layer.

The average surface roughness $R_Z$ may be determined to DIN 4768 using Taylor Hobson Talysurf 50 test equipment, where $R_Z$ is the average roughness depth calculated from the averages of the individual roughness depths from five successive individual measurement traverses within the roughness profile.

The halved-intensity angle of the backing layer is smaller than or equal to 6.5°, in particular smaller than or equal to 6°, preferably smaller than or equal to 5° and particularly preferably smaller than or equal to 3°. These values are measured by separating the scattering layer from the rear-projection screen, where the surface explained previously with a very low $R_{60°}$ gloss of the backing layer are encompassed by the measurement.

One of the means by which this low level of scattering is achieved is that the backing layer comprises no, or only a very small amount of, scattering media, where this statement relates to the entirety of the backing layer, and therefore a portion of the backing layer, e.g. a thin layer coextruded or laminated onto the same, may certainly comprise a relatively high proportion of scattering particles.

The thickness of the backing layer may vary widely, depending on the requirements for stability of the rear-projection screen. The thickness of the backing layer is generally in the range from 0.5 to 100 mm, preferably from 1 to 10 mm, particularly preferably from 1.5 to 6 mm and very particularly preferably from 2 to 4 mm.

According to one particular embodiment, the transmittance of the backing layer is greater than 85%, preferably greater than 88% and very particularly preferably greater than 90%. These values are measured without the scattering layer.

The yellowness index of the backing layer is smaller than 2 and preferably smaller than 1. These values are measured without the scattering layer.

The halved-intensity angle of the scattering layer is greater than or equal to 15°, in particular greater than or equal to 25°, the scattering being in particular produced by the particles present in the scattering layer.

Correspondingly, the scattering layer of the rear-projection screen according to the present invention preferably comprises from 2 to 60% by weight, in particular from 3 to 55% by weight and particularly preferably from 6 to 48% by weight, based on the weight of the scattering layer, of scattering particles, which are preferably spherical.

For the purposes of the present invention, the term spherical means that the particles preferably have a spherical shape, but it is clear to the person skilled in the art that, as a consequence of the methods of production, it is also possible that particles with some other shape may be present, or that the shape of the particles may deviate from the ideal spherical shape.

The term spherical therefore means that the ratio of the largest dimension of the particles to the smallest dimension is not more than 4, preferably not more than 2, each of these dimensions being measured through the centre of gravity of the particles. At least 70% of the particles are preferably spherical, particularly preferably at least 90%, based on the number of particles.

Scattering particles of this type are known per se and can be obtained commercially, and diffraction of light takes place here at the phase boundary between the scattering particles and the matrix plastic of the scattering layer.

Correspondingly, the refractive index $n_0$ of the scattering particles measured at 20° C. for the sodium D line (589 nm) differs by from 0.02 to 0.2 units from the refractive index $n_0$ of the matrix plastic of the scattering layer.

By way of example, the median (ponderal median) diameter of the scattering particles may be in the range from 0.1 to 40 μm, in particular from 5 to 30 μm.

Among these are in particular plastics particles, and also particles composed of inorganic materials, e.g. aluminium hydroxide, aluminium potassium silicate (mica), aluminium silicate (kaolin), barium sulphate ($BaSO_4$), calcium carbonate, magnesium silicate (talc). Among these, particular preference is given to particles composed of plastic.

The plastics particles which may be used according to the invention are not subject to any particular restriction. The nature of the plastic from which the plastics particles are produced is therefore substantially non-critical.

The median (ponderal median) diameter of preferred plastics particles is in the range from 5 to 35 μm, preferably in the range from 8 to 25 μm. It is advantageous for 75% of the plastics particles to lie in the range from 5 to 35 μm.

Laser extinction methods may be used to determine the particle size, and also the particle size distribution. For this, use may be made of a Galai-CIS-1 from L.O.T. GmbH, the test method for particle size determination being given in the user manual.

The plastics particles which may be used according to the invention are not subject to any particular restriction. The nature of the plastic from which the plastics particles are produced is therefore substantially non-critical, and diffraction of light takes place here at the phase boundary between the plastics beads and the matrix plastic.

The spherical plastics particles preferably encompass crosslinked polystyrene, polysilicone and/or crosslinked poly(meth)acrylates.

Preferred plastics particles used as scattering agents comprise silicones. By way of example, these particles are obtained via hydrolysis and polycondensation of organotrialkoxysilanes and/or of tetralkoxysilanes, these being described by the formulae $$R^1Si(OR^2)_3 \text{ and } Si(OR^2)_4$$

where $R^1$ is, by way of example, a substituted or unsubstituted alkyl group, an alkenyl group or a phenyl group, and the radical $R^2$ of the hydrolyzable alkoxy group is an alkyl group, such as methyl, ethyl or butyl, or an alkoxy-substituted hydrocarbon group, such as 2-methoxyethyl or 2-ethoxyethyl. Examples of organotrialkoxysilanes are methyltrimethoxysilane, methyltriethoxysilane, methyl-n-propoxysilane, methyl-triisopropoxysilane and methyltris(2-methoxyethoxy)-silane.

The abovementioned silane compounds, and processes for the production of spherical silicone particles, are known to those skilled in the art and are described in the specifications EP 1 116 741, JP 63-077940 and JP 2000-186148.

Scattering agents composed of silicone and particularly preferably used in the present invention are obtainable from GE Bayer Silicones with the trade names TOLSPEARL® 120 and TOLSPEARL® 3120.

Preferred plastics particles have a structure composed of:

b1) from 25 to 99.9 parts by weight of monomers which have aromatic groups as substituents, e.g. styrene, α-methylstyrene, ring-substituted styrenes, phenyl(meth)acrylate, benzyl(meth)-acrylate, 2-phenylethyl(meth)acrylate, 3-phenyl-propyl(meth)acrylate or vinyl benzoate; and b2) from 0 to 60 parts by weight of an acrylic and/or methacrylic ester having from 1 to 12 carbon atoms in the aliphatic ester radical, which are copolymerizable with the monomers b1), examples which may be mentioned being: methyl(meth)acrylate, ethyl(meth)acrylate, n-propyl (meth)acrylate, isopropyl(meth)acrylate, n-butyl(meth) acrylate, isobutyl(meth)acrylate, tert-butyl(meth)acrylate, cyclohexyl(meth)-acrylate, 3,3,5-trimethylcyclohexyl(meth)-acrylate, 2-ethylhexyl (meth)acrylate, norbornyl (meth)acrylate or isobornyl (meth)acrylate;

b3) from 0.1 to 1.5 parts by weight of crosslinking comonomers which have at least two ethylenically unsaturated groups capable of free-radical copolymerization with b1) and, where appropriate, with b2), e.g. divinylbenzene, glycol di(meth)acrylate, 1,4-butanediol di(meth)acrylate, allyl(meth)acrylate, triallyl cyanurate, diallyl phthalate, diallyl succinate, pentaerythritol tetra(meth)acrylate or trimethylolpropane tri(meth)acrylate, where the total amount of the comonomers b1), b2) and b3) is 100 parts by weight.

Mixtures from which the plastics particles are produced particularly preferably comprise at least 80% by weight of styrene and at least 0.5% by weight of divinylbenzene.

The preparation of crosslinked plastics particles is known to persons skilled in the art. For example, the scattering particles may be prepared via emulsion polymerization, as described by way of example in EP-A 342 283 or EP-A 269 324, or very particularly preferably via polymerization in an organic phase, e.g. as described in the German Patent Application P 43 27 464.1, the last-mentioned polymerization technique giving particularly narrow particle size distributions or, in other words, particularly low deviations of the particle diameters from the median particle diameter.

Particular preference is given to the use of plastics particles which withstand a temperature of at least 200° C., in particular of at least 250° C., with no intended resultant restriction. The expression "withstand a temperature" means that the particles undergo no substantial thermal degradation. Thermal degradation leads to undesirable discolouration, making the plastics material unusable.

Particularly preferred particles are obtainable, inter alia, from Sekisui with the trade name ®Techpolymer SBX-6, ®Techpolymer SBX-8 and ®Techpolymer SBX-12.

According to another preferred embodiment of the present invention, the size of the spherical particles is in the range from 15 to 35 μm. In this embodiment it is particularly preferable that at least 60% of the spherical particles have a diameter of at least 15 μm and that at most 30% of the scattering beads have a diameter of more than 25 μm. According to one particular aspect, at most 80% of these spherical particles have a size in the range from 15 to 25 μm.

According to one particular aspect of the present invention, these particles have uniform distribution in the plastics matrix, with no significant aggregation or agglomeration of the particles. Uniform distribution means that the concentration of particles is substantially constant within the plastics matrix.

According to one particular embodiment of the present invention, the scattering layer of the rear-projection screens comprises at least two particles (A) and (B) which differ in size, with no intended resultant restriction. The median (ponderal median) diameter of the particles (A) is generally in the range from 0.1 to 40 μm, preferably from 1 to 35 μm, with preference from 2 to 30 μm, in particular from 3 to 25 μm, particularly preferably from 4 to 20 μm and very particularly preferably from 5 to 15 μm, and their refractive index differs from that of the plastics matrix by from 0.02 to 0.2, while the median (ponderal median) diameter of the particles (B) is generally in the range from 10 to 150 μm, preferably from 15 to 70 μm and particularly preferably from 30 to 50 μm and their refractive index differs from that of the plastics matrix by from 0 to 0.2.

The ratio by weight of the scattering particles (A) to the particles (B) is preferably in the range from 1:10 to 10:1, in particular from 1:5 to 5:1, particularly preferably from 1:3 to 3:1 and very particularly preferably from 1:2 to 2:1.

The difference between the median size $V_{50}$ of the scattering particles (A) and of the particles (B) is preferably at least 5 μm, in particular at least 10 μm, the particles (B) being larger than the scattering particles (A).

Laser extinction methods may be used to determine the particle size, and also the particle size distribution. For this, use may be made of a Galay-CIS from L.O.T. GmbH, the test method for particle size and particle size distribution determination being given in the user manual. The median particle size $V_{50}$ is the ponderal median, where the value for 50% by weight of particles is smaller than or identical with this value and that for 50% by weight of these particles is greater than or identical with this value.

The light-scattering layer encompasses a plastics matrix, alongside the spherical particles. Plastics for producing the matrix of the scattering layer are well-known. Among these are in particular polycarbonates, cycloolefinic polymers and poly(meth)acrylates, preference being given to poly(meth) acrylates. These plastics have been described in detail above.

The scattering layer particularly preferably comprises polymethyl methacrylate (PMMA). According to one particular aspect of the present invention, the light-scattering polymethyl methacrylate layer encompasses at least 30% by weight of polymethyl methacrylate, based on the weight of the light-scattering layer.

Polymethyl methacrylates are generally obtained by free-radical polymerization of mixtures which comprise methyl methacrylate. These mixtures generally comprise at least 40% by weight, preferably at least 60% by weight and particularly preferably at least 80% by weight of methyl methacrylate, based on the weight of the monomers.

Besides this, these mixtures for preparing polymethyl methacrylates may comprise other (meth)acrylates which are copolymerizable with methyl methacrylate. These monomers have been described above.

Furthermore, the matrix of the light-scattering layer may comprise other polymers, in order to modify the properties. Among these are polyacrylonitriles, polystyrenes, polyethers, polyesters, polycarbonates and polyvinyl chlorides. These polymers may be used individually or in the form of a mixture, and use may also be made of copolymers which can be derived from the abovementioned polymers.

According to one particular embodiment of the present invention, the matrix of the scattering layer comprises at least 70% by weight, preferably at least 80% by weight and particularly preferably at least 90% by weight, of polymethyl methacrylate, based on the weight of the matrix of the light-scattering layer.

According to one particular aspect of the present invention, the refractive index of the poly(meth)acrylates of the matrix of the light-scattering layer is in the range from 1.46 to 1.54, measured at 20° C. for the sodium D line (589 nm).

The thickness of the light-scattering layer is generally in the range from 0.05 to 4 mm, preferably from 0.05 to 2 mm, with preference from 0.1 to 1 mm, in particular from 0.2 to 0.8 mm, with no intended resultant restriction.

According to one particular aspect of the present invention, the concentration of the spherical particle $c_P$, the thickness of the scattering layer $d_S$, and the size of the spherical particles $D_P$ may be selected in such a way that the ratio of the product of concentration of the spherical particle $c_P$ and thickness of the scattering layer to the third power of the size of the spherical particles $c_P*d_S/D_P^3$ is in the range from 0.001 to 0.015% by weight*mm/µm$^3$, preferably from 0.0025 to 0.009% by weight*mm/µm$^3$.

In one particular embodiment of the present invention, the ratio of the square of average surface roughness of the polymethyl methacrylate layer $R_Z$ to the third power of the size of the spherical particles $R_Z^2/D_P^3$ may preferably be in the range from 0.0002 to 0.1300 µm$^{-1}$, in particular from 0.0009 to 0.0900 µm$^{-1}$ and preferably from 0.00025 to 0.0600 µm$^{-1}$ and particularly preferably from 0.0025 to 0.0600 µm$^{-1}$.

According to one particular aspect of the screen of the present invention, the ratio of concentration of the spherical particles $c_P$ to the thickness of the scattering layer $d_S$ $c_P/d_S$ is greater than or equal to 2.5% by weight/mm, in particular greater than or equal to 4% by weight/mm.

The gloss $R_{85°}$ of the scattering layer is preferably smaller than or equal to 60, in particular smaller than or equal to 50.

The ratio of thickness of the scattering layer $d_S$ and size of the spherical particles $D_P$ $d_S/D_P$ is preferably in the range from 1 to 500, in particular from 1 to 250, preferably from 2.5 to 250 and particularly preferably from 2.5 to 150, with no intended resultant restriction.

According to one particular embodiment of the present invention, the average surface roughness $R_Z$ of the scattering layer is preferably in the range from 5 to 50 µm, in particular from 5 to 25 µm, preferably from 6 to 35 µm, in particular from 15 to 50 µm, particularly preferably from 6 to 30 µm.

Within this range, scratches on the surface of the light-scattering layer are visible only to a particularly small extent. This scratch resistance may be determined to DIN 53799 and DIN EN 438 via a visual assessment of a damaged surface, the damage being brought about by a diamond acting with varying force on the surface.

The scattering layer may be produced by known processes, preference being given to thermoplastic shaping processes. After addition of the particles, light-scattering layers may be produced from the moulding compositions described above via conventional thermoplastic shaping processes.

According to one particular embodiment, a twin-screw extruder is used for extrusion or to produce pellets of moulding compositions comprising scattering beads. In this process, the plastics particles are preferably conveyed into the melt within the extruder. This measure can give melts from which it is possible to provide screens which have particularly high transmittance.

The scattering layer here may be produced via a two-stage process in which the extrusion of the film or sheet in a single-screw extruder is carried out downstream of an inventive sidefeeder compounding process in a twin-screw extruder and intermediate pelletization. The pellets obtained via the twin-screw extruder may be provided with particularly high proportions of scattering beads, making it simple to produce projection screens with varying content of scattering beads via blending with moulding compositions without scattering beads.

It is also possible to carry out a single-stage process in which the compounding of the spherical plastics particles into the melt takes place as described in a twin-screw extruder which, where appropriate, has a downstream pressure-increasing unit (e.g. melt pump) which is immediately followed by the extrusion die, which extrudes a sheet product. Surprisingly, the measures described above can give rear-projection screens with a particularly low yellowness index.

The screens may moreover also be produced by injection moulding, in which case, however, the selection of the process parameters or the injection mould is to be such as to give a surface roughness in the inventive range.

The compounding of the matrix with the scattering particles preferably takes place via a twin-screw extruder, and the actual sheet extrusion can also use a single-screw extruder, with no intended resultant restriction.

The surface roughness $R_z$ of the scattering layer may be affected via variation of various parameters, which depend on the production method. Among these are the temperature of the melt during the extrusion process, a rougher surface being given by a higher temperature of the melt. However, a factor which has to be considered here is that the temperature of the melt depends on the precise constitution of the moulding composition. The temperature of the melt is generally in the range from 150 to 300° C., preferably in the range from 200 to 290° C. These temperatures are based on the temperatures of the melt on discharge from the die.

The surface roughness may also be affected via the gap between the rolls used to polish the sheets. For example, if a polishing stack encompasses three rolls in an L arrangement, where the moulding composition is conducted from the die into the gap between roll 1 and roll 2 and has 60-180° wrap around roll 2, the gap between roll 2 and roll 3 polishes the surfaces. If the gap between roll 2 and roll 3 is adjusted to the thickness of the sheet, the scattering particles on the sheet surface are pressed into the matrix, making the surface more polished. To achieve a rougher surface, this gap is generally adjusted to be somewhat larger than the thickness of the sheet to be produced, the relevant value being in the range from 0.1 to 2 mm above the thickness of the sheet, preferably from 0.1 to 1.5 mm above the thickness of the sheet, with no intended resultant restriction. The surface roughness is also affected via the particle size and the thickness of the sheet, the dependencies being shown in the examples.

The scattering layer may be bonded to the backing layer via known processes. Among these are, by way of example, adhesive bonding or lamination.

In addition, the two layers may be obtained via coextrusion in one operation.

In the case of production via a casting process, the scattering layer may serve as a boundary of the casting cell, the result being polymerization of the backing layer onto the scattering layer.

The quotient calculated by dividing the thickness of the backing layer by the thickness of the scattering layer is preferably in the range from 1:2 to 100:1, in particular from 1:1 to 50:1 and preferably from 3:1 to 10:1.

According to one particular aspect of the present invention, the plastics for the production of the backing layer and/or of the scattering layer may, where appropriate, be rendered more mechanically stable by using an impact modifier. These impact modifiers are well-known and, by way of example, the preparation and the structure of impact-modified polymethacrylate moulding compositions are described, inter alia, in EP-A 0 113 924, EP-A 0 522 351, EP-A 0 465 049 and EP-A 0 683 028. Appropriate modifiers are also known for other plastics.

Preferred impact-resistant moulding compositions which can serve for preparing the matrix generally comprise from 50 to 99% by weight, in particular from 70-98% by weight, of polymethyl methacrylate. These polymethyl methacrylates have been described above.

According to one particular aspect of the present invention, the polymethyl methacrylates used to prepare impact-modified moulding compositions are obtained via free-radical polymerization of mixtures which encompass from 80 to 100% by weight, preferably from 90 to 98% by weight, of methyl methacrylate and, where appropriate, from 0 to 20% by weight, preferably from 2 to 10% by weight, of other comonomers capable of free-radical polymerization, these likewise having been listed above. Particularly preferred comonomers are, inter alia, $C_1$-$C_4$-alkyl(meth)acrylates, in particular methyl acrylate, ethyl acrylate or butyl methacrylate.

The average molar mass $M_w$ of the polymethyl methacrylates which can serve for preparing the impact-modified matrix is preferably in the range from 90 000 to 200 000 g/mol, in particular from 100 000 to 150 000 g/mol.

Preferred impact-resistant moulding compositions which can serve for preparing the matrix comprise from 0.5 to 55% by weight, preferably from 1 to 45% by weight, particularly preferably from 2 to 40% by weight, in particular from 3 to 35% by weight, of an impact modifier, this being an elastomer phase composed of crosslinked polymer particles.

The impact modifier may be obtained in a known manner via bead polymerization or via emulsion polymerization.

Preferred impact modifiers are crosslinked particles whose median size is in the range from 50 to 1000 nm, preferably from 60 to 500 nm and particularly preferably from 80 to 120 nm.

By way of example, these particles may be obtained via free-radical polymerization of mixtures which generally comprise at least 40% by weight, preferably from 50 to 70% by weight, of methyl methacrylate, from 20 to 80% by weight, preferably from 25 to 35% by weight, of butyl acrylate, and also from 0.1 to 2% by weight, preferably from 0.5 to 1% by weight, of a crosslinking monomer, e.g. a polyfunctional (meth)acrylate, e.g. allyl methacrylate, and which comprise comonomers which can be copolymerized with the abovementioned vinyl compounds.

Among the preferred comonomers are, inter alia, $C_1$-$C_4$-alkyl(meth)acrylates, such as ethyl acrylate or butyl methacrylate, preferably methyl acrylate, or other monomers including vinyl groups capable of polymerization, e.g. styrene. The mixtures for producing the abovementioned particles may preferably encompass from 0 to 10% by weight, with preference from 0.5 to 5% by weight, of comonomers.

Particularly preferred impact modifiers are polymer particles which have a two-layer, or particularly preferably a three-layer, core-shell structure. These core-shell polymers are described in EP-A 0 113 924, EP-A 0 522 351, EP-A 0 465 049 and EP-A 0 683 028, inter alia.

Particularly preferred impact modifiers based on acrylate rubber have the following structure, inter alia:
Core: Polymer with at least 90% by weight methyl methacrylate content, based on the weight of the core.
Shell 1: Polymer with at least 80% by weight butyl acrylate content, based on the weight of the first shell.
Shell 2: Polymer with at least 90% by weight methyl methacrylate content, based on the weight of the second shell.

The core may comprise not only the monomers mentioned but also other monomers, as may each of the shells.

These have been mentioned previously, with particularly preferred comonomers having a cross-linking action.

By way of example, a preferred acrylate rubber modifier may have the following structure:
Core: Copolymer composed of methyl methacrylate (95.7% by weight), ethyl acrylate (4% by weight) and allyl methacrylate (0.3% by weight)
S1: Copolymer composed of butyl acrylate (81.2% by weight), styrene (17.5% by weight) and allyl methacrylate 1.3% by weight)
S2: Copolymer composed of methyl methacrylate (96% by weight) and ethyl acrylate (4% by weight).

The core:shell(s) ratio of the acrylate rubber modifiers may vary within a wide range. The core:shell ratio C/S is preferably in the range from 20:80 to 80:20, with preference from 30:70 to 70:30 in the case of modifiers with one shell, or in the case of modifiers with two shells the core:shell 1:shell 2 ratio C/S1/S2 is preferably in the range from 10:80:10 to 40:20:40, particularly preferably from 20:60:20 to 30:40:30.

The particle size of the core-shell modifier is usually in the range from 50 to 1000 nm, preferably from 100 to 500 nm and particularly preferably from 150 to 450 nm, with no intended resultant restriction.

Impact modifiers of this type are commercially obtainable from Mitsubishi with the trade name METABLEN® IR 441. It is also possible to obtain impact-modified moulding compositions.

According to one particular aspect of the present invention, the transmittance of the screen is greater than or equal to 25%, in particular greater than or equal to 40% and particularly preferably greater than or equal to 55%, these values being in particular achieved by screens without contrast-improving dyes.

According to one particular aspect of the present invention, the moulding composition or the resin for the production of the backing layer and/or of the scattering layer may be coloured. Surprisingly, this measure can increase the contrast. Particularly suitable materials for the colouring process are dyes known per se and/or carbon black. Particularly preferred dyes are commercially available. Among these are ®Sandoplast Red G and ®Sandoplast Yellow 2G, each from Clariant, and ®Macrolex Green 5B and ®Macrolex Violet 3R, each from Bayer. The concentration of these dyes depends on the desired perceived colour, and also on the thickness of the sheet. With no intended resultant restriction, this concentration is generally in the range from 0 to 0.8% by weight per dye, preferably from 0.000001 to 0.4% by weight, based on the total weight of the coloured moulding composition without scattering beads. The sum of the dye concentrations is preferably in the range from 0 to 1% by weight, preferably from 0.0001 to 0.6% by weight, based on the total weight of the coloured moulding composition without scattering beads. The loss of transmittance may at least to some extent be compensated via more powerful projectors.

The yellowness index of the screen is preferably smaller than or equal to 12, in particular smaller than or equal to 10, with no intended resultant restriction.

According to one particular aspect of the present invention, the screen exhibits a scattering power greater than or equal to 0.15, in particular greater than or equal to 0.35, with no intended resultant restriction.

According to one preferred embodiment, the surface of the inventive polymethyl methacrylate sheets has a matt appearance under reflected light. Gloss measurement using a reflectometer to DIN 67530 may be used for characterization. The gloss of the sheets is preferably below 50, particularly preferably below 40 and very particularly preferably below 30, with an angle of 85°.

There is no restriction on the size and shape of the rear-projection screen of the present invention. However, the screen usually has the shape of a rectangular panel, because it is the usual format for presenting pictures.

The length of this type of rear-projection screen is preferably in the range from 25 to 10 000 mm, with preference from 50 to 3000 mm and particularly preferably from 200 to 2000 mm. The width of this particular embodiment is generally in the range from 25 to 10 000 mm, preferably from 50 to 3000 mm and particularly preferably from 200 to 2000 mm. Two or more of these screens may be brought together in order to provide a particularly large projection surface.

According to one particular embodiment, the screen has particularly high weathering resistance to DIN EN ISO 4892, Part 2—Methods of exposure to laboratory light sources: xenon arc sources.

Inventive examples and comparative examples are used below for more detailed description of the invention, but there is no intention that the invention be restricted to these inventive examples.

EXAMPLES

A) Test methods

Average roughness $R_a$ was determined to DIN 4768 using Taylor Hobson Talysurf 50 test equipment.

Transmittance $\tau_{D65/2°}$ was determined to DIN 5036 using Perkin Elmer Lambda 19 test equipment.

Yellowness index $\tau_{D65/10°}$ was determined to DIN 6167 using Perkin Elmer Lambda 19 test equipment.

R85° gloss was determined at 85° to DIN 67530 using a laboratory reflectometer from Dr. Lange.

Scattering power and halved-intensity angle were determined to DIN 5036 using a GO-T-1500 LMT goniometer test unit.

The various rear-projection screens were also assessed visually on the basis of the criteria shown in Table 1.

The projector used here was an Epson EMP-713. The test picture was assessed at a distance of about 1-1.5 m from the image at various angles (0°=perpendicular to the projection normal, 30° and 60°). The distance of the projector from the projection sheet was about 85 cm and the image diagonal was about 50 cm.

Technical data for Epson EMP 713 projector:

Projection system: dichroitic mirror and lens system, pixels: 2359296 pixels (1024×768)*3, brightness: 1200 ANSI lumens, contrast: 400:1, picture brilliance: 85%, colour output: 24 bit, 16.7 million colours, H: 15-92 kHz, V: 50-85 Hz, lamp: 150 watt UHE, video resolution: 750 TV lines

TABLE 1

| Criterion | Property |
| --- | --- |
| Hot spot | A hot spot is light distribution associated with the conical beam of light of the projection illumination system. A hot spot is therefore a conical beam of light with substantially greater brightness in the centre than at the margin of the image. If the hot spot is very pronounced, the projector lamp is visually detectable. |
| Brightness distribution | Brightness distribution is likewise assessed via the distribution of light on the image surface and therefore characterizes the extent to which the illumination of the image extends from the centre to the margin. |
| Picture sharpness Resolution | Picture sharpness is the degree of perceived clarity of the test picture. The resolution of the image gives the extent to which fine structures are distorted on the sheet assessed. |
| Picture steadiness | Picture steadiness is the extent to which the observer can receive the projected information over a prolonged period without eye strain. |

The tables indicate very good properties by ++, good properties by +, satisfactory properties by 0, unsatisfactory properties by −, very unsatisfactory properties by −− and inadequate properties by −−−.

B) Preparation of Plastics Particles

Plastics Particles B1

To prepare spherical plastics particles, use was made of an aluminium hydroxide Pickering stabilizer, prepared by precipitation from aluminium sulphate and soda solution directly prior to starting the actual polymerization. To this end, 16 g of $Al_2(SO_4)_3$, 0.032 g of complexing agent (Trilon A) and 0.16 g of emulsifier (emulsifier K 30 obtainable from Bayer AG; sodium salt of a $C_{15}$ paraffinsulphonate) were first dissolved in 0.8 of distilled water. A 1N sodium carbonate solution was then added, with stirring and at a temperature of about 40° C., to the aluminium sulphate dissolved in water, the resultant pH being in the range from 5 to 5.5. This procedure gave a colloidal dispersion of the stabilizer in the water.

After the precipitation of the stabilizer, the aqueous phase was transferred to a glass beaker. 110 g of methyl methacrylate, 80 g of benzyl methacrylate, 10 g of allyl methacrylate, 4 g of dilauryl peroxide and 0.4 g of tert-butyl 2-ethylperhexanoate were added into the beaker. This mixture was dispersed by a disperser (UltraTurrax S50N-G45MF, Janke and Kunkel, Staufen) for 15 minutes at 7000 rpm.

Following this exposure to shear, the reaction mixture was charged to the reactor, which had been preheated to the appropriate reaction temperature of 80° C., and polymerized with stirring (600 rpm) at about 80° C. (polymerization temperature) for 45 minutes (polymerization time). A post-reaction phase then followed at about 85° C. internal temperature for 1 hour. After cooling to 45° C., the stabilizer was converted into water-soluble aluminium sulphate by adding 50% strength sulphuric acid. The beads were worked up by filtering the resultant suspension through a commercially available textile filter and drying at 50° C. for 24 hours in a heated cabinet.

Laser extinction methods were used to study the size distribution. The median size $V_{50}$ of the particles was 18.6 μm. The beads had a spherical shape, no fibres being detected. No coagulation occurred. The resultant particles are termed plastics particles B1 below.

Plastics Particles B2

To prepare spherical plastics particles, use was made of an aluminium hydroxide Pickering stabilizer, prepared by precipitation from aluminium sulphate and soda solution (1N sodium carbonate solution) directly prior to starting the actual polymerization. To this end, 38 L of deionized water, 400 g of aluminium sulphate and 8 g of complexing agent (Trilon A) were first used to form an initial charge, with stirring (330 rpm) using an impeller stirrer, in an $N_2$-flushed 100 L V4A tank with baffle, Ni—Cr—Ni temperature sensor and circulatory heating system. 1760 g of soda solution were then added to precipitate the aluminium hydroxide, and the dispersing agent K30 emulsifier (4 g) obtainable from Bayer AG (sodium salt of a C15 paraffinsulphonate) and Polywax 5000/6000 (4 g) obtainable from Hoechst (polyethylene glycol with a molecular weight in the range from 5000 to 6000), each dissolved in 240 ml of deionized water, were also added. Following the precipitation, the pH was about 5.3, thus giving colloidal dispersion of the stabilizer in the water.

A monomer mixture composed of 6900 g of methyl methacrylate, 3000 g of styrene, 100 g of glycol dimethacrylate, 200 g of dilauroyl peroxide, 20 g of tert-butyl 2-ethylperhexanoate and 50 g of ethylhexyl thioglycolate was then added, likewise at room temperature.

The heating phase then followed to a temperature of 80° C., and at an internal tank temperature of 40° C. the reactor was sealed so as to be pressure-tight and the $N_2$ supply was stopped. In the next 115 minutes, the internal temperature rises to about 87° C. and the pressure increases from 0.70 to 0.92 bar. After the temperature peak, the reaction mixture was heated to about 87-88° C., and stirring of the mixture was continued for about an hour at this temperature, the stirrer speed being reduced to 200 rpm. After the reaction mixture had been cooled, the tank was depressurized at a temperature of 46° C. and then 400 ml of 50% strength sulphuric acid were added, thus converting the aluminium hydroxide into soluble aluminium sulphate with resultant precipitation of the suspension polymer. For the work-up of the beads, the resultant suspension was filtered through a stoneware suction funnel with textile filter, washed until neutral, and dried in a heated cabinet for about 20 hours at 50° C.

Laser extinction methods were used to study the size distribution. The median size $V_{50}$ of the particles was 40.5 μm. The beads had a spherical shape, no fibres being detected. No coagulation occurred. The resultant particles are termed plastics particles B2 below.

C) Production of a scattering layer

A scattering layer was produced by extrusion. For this, a compounded material comprising scattering beads was extruded from 6% by weight of plastics particles B2, 6% by weight of plastics particles based on styrene with a particle size $V_{50}$ of about 8.4 μm, these being commercially available with the trademark ®Techpolymer SBX-8 from Sekisui, and 88% by weight of a PMMA moulding composition (copolymer of 97% by weight of methyl methacrylate and 3% by weight of methyl acrylate) obtainable from Röhm GmbH & Co. KG to give a plastics sheet whose thickness was 0.5 mm. A BREYER Ø60 mm extruder was used. The temperature of the melt on discharge from the die was generally 270° C. The setting of the polishing stack was such as to achieve maximum surface roughness. The surface roughness $R_z$ was 15.0 μm.

D) Production of Backing Layers 1-11

Various backing layers were produced by various processes. Backing layer 1 was produced via extrusion of a PMMA moulding composition (copolymer of 97% by weight of methyl methacrylate and 3% by weight of methyl acrylate) obtainable from Röhm GmbH & Co. KG. The thickness of backing layer 1 was 3 mm. An embossing roll was used here.

Backing layers 2-5 were produced via coextrusion. Here, a 2 mm layer was coextruded from a PMMA moulding composition (copolymer of 97% by weight of methyl methacrylate and 3% by weight of methyl acrylate) obtainable from Röhm GmbH & Co. KG with a layer of about 100 μm which comprised various proportions of plastics particles B1 alongside a PMMA moulding composition (copolymer of 97% by weight of methyl methacrylate and 3% by weight of methyl acrylate) obtainable from Röhm GmbH & Co. KG. The thickness of the backing layer was 2 mm. The various proportions of plastics particles B1 in the coextrusion layer of thickness 100 μm are shown in Table 2.

TABLE 2

|  | Backing layer 2 | Backing layer 3 | Backing layer 4 | Backing layer 5 |
|---|---|---|---|---|
| Base layer | | | | |
| PMMA matrix [% by weight] | 100 | 100 | 100 | 100 |
| Thickness [mm] | 2 | 2 | 2 | 2 |
| Coextrusion layer | | | | |
| Thickness [mm] | 0.1 | 0.1 | 0.1 | 0.1 |
| PMMA matrix [% by weight] | 97 | 94 | 88 | 76 |
| Plastics particle B1 [% by weight] | 3 | 6 | 12 | 24 |

Backing layers 6-9 were produced via coextrusion. Here, a 2 mm layer was coextruded from a PMMA moulding composition (copolymer of 97% by weight of methyl methacrylate and 3% by weight of methyl acrylate) obtainable from Röhm GmbH & Co. KG with a layer of about 100 μm which comprised various proportions of plastics particles B2 alongside a PMMA moulding composition (copolymer of 97% by weight of methyl methacrylate and 3% by weight of methyl acrylate) obtainable from Röhm GmbH & Co. KG. The thickness of the backing layers was 2 mm. The various proportions of plastics particles B2 in the coextrusion layer of thickness 100 μl are shown in Table 3.

TABLE 3

|  | Backing layer 6 | Backing layer 7 | Backing layer 8 | Backing layer 9 |
|---|---|---|---|---|
| Base layer | | | | |
| PMMA matrix [% by weight] | 100 | 100 | 100 | 100 |
| Thickness [mm] | 2 | 2 | 2 | 2 |
| Coextrusion layer | | | | |
| Thickness [mm] | 0.1 | 0.1 | 0.1 | 0.1 |
| PMMA matrix [% by weight] | 97 | 94 | 88 | 76 |
| Plastics particle B2 [% by weight] | 3 | 6 | 12 | 24 |

The production of backing layer 10 was similar to that of backing layer 1 except that a conventional polishing roll was used, without embossment.

The production of backing layers 11-14 was similar to that of backing layers 2 and 3, but the thickness of the backing layers was varied. The details can be found in Table 0.4.

TABLE 4

|  | Backing layer 11 | Backing layer 12 | Backing layer 13 | Backing layer 14 |
|---|---|---|---|---|
| Base layer | | | | |
| PMMA matrix [% by weight] | 100 | 100 | 100 | 100 |
| Thickness [mm] | 4 | 6 | 4 | 6 |
| Coextrusion layer | | | | |
| Thickness [mm] | 0.1 | 0.1 | 0.1 | 0.1 |
| PMMA matrix [% by weight] | 97 | 97 | 94 | 94 |
| Plastics particle B1 [% by weight] | 3 | 3 | 6 | 6 |

The production of backing layers 15-18 was similar to that of backing layers 6 and 7, but the thickness of the backing layers was varied. The details can be found in Table 5.

TABLE 5

|  | Backing layer 15 | Backing layer 16 | Backing layer 17 | Backing layer 18 |
|---|---|---|---|---|
| Base layer | | | | |
| PMMA matrix [% by weight] | 100 | 100 | 100 | 100 |
| Thickness [mm] | 4 | 6 | 4 | 6 |
| Coextrusion layer | | | | |
| Thickness [mm] | 0.1 | 0.1 | 0.1 | 0.1 |
| PMMA matrix [% by weight] | 97 | 97 | 94 | 94 |
| Plastics particle B2 [% by weight] | 3 | 3 | 6 | 6 |

The properties of the backing layers produced are shown in Table 6, where the roughness $R_Z$ and the gloss $R60°$ at 600 were each determined on the rougher surface provided with an embossment or 100 μm coextrusion layer encompassing plastics particles B1 or B2. The opposite surface was smooth.

TABLE 6

|  | Backing layer | | | | |
|---|---|---|---|---|---|
|  | 1 | 2 | 3 | 4 | 5 |
| Light transmittance ($\square_{D65/2°}$) [%] | 90.73 | 90.93 | 91.12 | 91.75 | 91.55 |
| Yellowness index ($\square_{D65/10°}$) | 0.84 | 0.13 | −0.1 | −0.08 | 0.01 |
| Halved-intensity angle $\square$ [°] | 1.5 | 1.36 | 1.83 | 3.97 | 9.59 |
| Roughness $R_Z$ [μm] | 3.89 | 3.62 | 5.37 | 8.61 | 18.65 |
| R60° gloss | 31.5 | 56.0 | 34.1 | 13.3 | 3.9 |

|  | Backing layer | | | | |
|---|---|---|---|---|---|
|  | 6 | 7 | 8 | 9 | 10 |
| Light transmittance ($\square_{D65/2°}$) [%] | 91.18 | 90.84 | 91.71 | 87.98 | 92.11 |
| Yellowness index ($\square_{D65/10°}$) | 0.36 | 0.37 | 0.07 | 0.02 | 0.28 |
| Halved-intensity angle $\square$ [°] | 1.23 | 1.4 | 3.37 | 6.96 | <0.5 |
| Roughness $R_Z$ [μm] | 5.47 | 7.29 | 30.62 | 50.28 | 0.01 |
| R60° gloss | 56.5 | 28.6 | 7.6 | 2.3 | 86.4 |

The roughness $R_Z$ and the gloss of backing layers 11 and 12 were the same as the values for backing layer 2. The roughness $R_Z$ and the gloss of backing layers 13 and 14 were the same as the values for backing layer 3. The roughness $R_Z$ and the gloss of backing layers 15 and 16 were the same as the values for backing layer 6. The roughness $R_Z$ and the gloss of backing layers 17 and 18 were the same as the values for backing layer 7.

Inventive Examples 1-15 and Comparative Examples 1-3

Rear-projection screens were produced by attaching the scattering layer to the various backing layers 1 to 10.

The test results obtained in accordance with the abovementioned methods are shown in Table 7.

TABLE 7

|  | Inventive Example 1 | Inventive Example 2 | Inventive Example 3 |
|---|---|---|---|
| Backing layer | 1 | 2 | 3 |
| Hot spot | ++ | ++ | ++ |
| Brightness distribution | ++ | ++ | ++ |
| Picture sharpness | + | + | +/0 |
| Resolution | fine-very fine | fine-very fine | fine |
| Picture steadiness | + | + | + |
| Discernible reflection image (<0.5 m/>2 m) | no/no | slight/no | slight/no |

|  | Inventive Example 4 | Comparative Example 1 | Inventive Example 5 |
|---|---|---|---|
| Backing layer | 4 | 5 | 6 |
| Hot spot | ++ | ++ | ++ |
| Brightness distribution | ++ | ++ | ++ |
| Picture sharpness | 0 | −− | + |
| Resolution | moderate | very coarse | fine-very fine |
| Picture steadiness | + | + | + |
| Discernible reflection image (<0.5 m/>2 m) | no/no | no/no | slight/no |

|  | Inventive Example 6 | Inventive Example 7 | Comparative Example 2 |
|---|---|---|---|
| Backing layer | 7 | 8 | 9 |
| Hot spot | ++ | ++ | ++ |

TABLE 7-continued

|  |  |  |  |
|---|---|---|---|
| Brightness distribution | ++ | ++ | ++ |
| Picture sharpness | +/0 | 0 | -- |
| Resolution | fine | moderate | very coarse |
| Picture steadiness | + | + | + |
| Discernible reflection image (<0.5 m/>2 m) | no/no | no/no | no/no |

|  | Comparative Example 3 | Inventive Example 8 | Inventive Example 9 |
|---|---|---|---|
| Backing layer | 10 | 11 | 12 |
| Hot spot | ++ | ++ | ++ |
| Brightness distribution | ++ | ++ | ++ |
| Picture sharpness | + | +/0 | 0 |
| Resolution | fine-very fine | moderate | moderate |
| Picture steadiness | + | + | + |
| Discernible reflection image (<0.5 m/>2 m) | yes/yes | slight/no | slight/no |

|  | Inventive Example 10 | Inventive Example 11 | Inventive Example 12 |
|---|---|---|---|
| Backing layer | 13 | 14 | 15 |
| Hot spot | ++ | ++ | ++ |
| Brightness distribution | ++ | ++ | ++ |
| Picture sharpness | 0 | 0/− | +/0 |
| Resolution | moderate | moderate | moderate |
| Picture steadiness | + | + | + |
| Discernible reflection image (<0.5 m/>2 m) | slight/no | slight/no | slight/no |

|  | Inventive Example 13 | Inventive Example 14 | Inventive Example 15 |
|---|---|---|---|
| Backing layer | 16 | 17 | 18 |
| Hot spot | ++ | ++ | ++ |
| Brightness distribution | ++ | ++ | ++ |
| Picture sharpness | 0 | 0/− | − |
| Resolution | moderate | moderate | coarse |
| Picture steadiness | + | + | + |
| Discernible reflection image (<0.5 m/>2 m) | slight/no | slight/no | slight/no |

Rear-projection Screens for 3D Projection

The inventive rear-projection screen can also be used for 3D projection of pictures or of films.

The source of the picture for the 3D projection process is each of two superposed projected images, the picture content conveyed by which is in principle identical but involves a shift by a certain distance, e.g. the distance between the eyes. An example of the principle often used is the polarization method. Projectors operating with polarized light are used to shine the light from both recorded images with different directions of polarization onto the rear-projection screen.

The viewer views the picture through spectacles equipped with separate appropriate polarization filters for the right and the left eye. The human brain processes the two different perceived images, the result being that a three-dimensional picture is perceived.

For the purposes of 3D projection, the inventive rear-projection screens may be manufactured in the form of a sheet or film encompassing the backing layer and the light-scattering layer, preferably composed of coextruded polymethyl methacrylate, the total path difference due to optical birefringence being at most 25 nm, preferably at most 15 nm, particularly preferably at most 5 nm.

A factor which has to be considered here is that the extrusion process always brings about a certain orientation of the molecular chains in the direction of extrusion. This orientation leads to birefringence properties which to some extent depolarize the polarized light of the two projected images, this of course being undesirable.

It is therefore particularly preferable that the extruded polymethyl methacrylate for rear-projection screens intended for 3D projection be subjected to a thermal post-treatment after extrusion. During the thermal post-treatment, recovery occurs and returns the orientation of the polymer molecules to a substantially lower level. The result is a great reduction in the level of the birefringence property present initially in the material.

By way of example, the thermal post-treatment of extruded polymethyl methacrylate in the form of films or sheets intended for rear-projection screens for 3D projection may take place in the range from 110 to 190° C., preferably from 120 to 160° C., for from 5 minutes to 24 hours, preferably for from 10 minutes to 2 hours, depending on the constitution of the material and its thickness. Optimization can easily be achieved here by a person skilled in the art. The thermal recovery process may be undertaken while the material is supported from below, or preferably suspended.

The person skilled in the art is aware of suitable test methods for measuring the path difference due to optical birefringence. By way of example, the path difference may be measured with the aid of a polarizing microscope in combination with an Ehringhaus tilting compensator.

The invention claimed is:

1. A rear-projection screen comprising at least one scattering layer comprising scattering particles and comprising at least one backing layer,
    wherein
    the scattering layer has a halved-intensity angle greater than or equal to 15°,
    the backing layer has a halved-intensity angle smaller than or equal to 6.5°,
    the gloss $R_{60°}$ of the backing layer is smaller than or equal to 70, and
    a median diameter of the scattering particles is in a range from 0.1 to 40 μm.

2. The rear-projection screen according to claim 1, wherein the scattering particles encompass plastic.

3. The rear-projection screen according to claim 1, wherein the average surface roughness $R_z$ of a surface of the backing layer is in a range from 3 to 40 μm.

4. The rear-projection screen according to claim 1, wherein the gloss $R_{85°}$ of the scattering layer is smaller than or equal to 60.

5. The rear-projection screen according to claim 1, wherein the backing layer has a multilayer structure.

6. The rear-projection screen according to claim 1, wherein the gloss of the backing layer is achieved via application of a film.

7. The rear-projection screen according to claim 1, wherein the halved-intensity angle of the backing layer is smaller than or equal to 3°.

8. The rear-projection screen according to claim 1, wherein a thickness of the backing layer is in a range from 1 to 10 mm.

9. The rear-projection screen according to claim 1, wherein a thickness of the scattering layer is in a range from 0.1 to 1 mm.

10. The rear-projection screen according to claim 1, wherein the quotient calculated by dividing a thickness of the backing layer by a thickness of the scattering layer is in a range from 1:1 to 50:1.

11. The rear-projection screen according to claim 1, wherein the average surface roughness $R_z$ of the scattering layer is in a range from 4 to 50 µm.

12. The rear-projection screen according to claim 1, wherein the scattering layer encompasses at least two particles (A) and (B), which differ in size.

13. The rear-projection screen according to claim 12, wherein the a median diameter of the particles (A) is in the a range from 0.1 to 40 µm and their refractive index differs from that of a plastic matrix by from 0.02 to 0.2, while a median diameter of the particles (B) is in the a range from 10 to 150 µm and their refractive index differs from that of a polymethyl methacrylate matrix by from 0 to 0.2.

14. The rear-projection screen according to claim 1, wherein the scattering layer and/or the backing layer has been colored.

15. The rear-projection screen according to claim 1, wherein the transmittance of the rear-projection screen is at least 25%.

16. The rear-projection screen according to claim 1, wherein the scattering layer and the backing layer are composed of coextruded polymethyl methacrylate with a path difference of at most 25 nm due to optical birefringence.

17. A process for producing the rear-projection screen according to claim 16, wherein the polymethyl methacrylate is extruded, thereby producing a sheet or film, and the extruded sheet or film is then heated to 110-190° C. for from 5 minutes to 24 hours.

18. A process for projecting in 3D comprising projecting an image in 3D by the rear-projection screen according to claim 16.

19. The rear-projection screen according to claim 1, wherein the D65/10° yellowness index of the rear-projection screen to DIN 6167 is smaller than or equal to 12.

20. The rear-projection screen according to claim 19, wherein the weathering resistance of the rear-projection screen to DIN 53 387 is at least 5000 hours.

21. A process for producing the rear-projection screen according to claim 1, wherein a molding composition which comprises scattering particles is extruded, thereby producing a layer, and the layer is then bonded to a backing layer.

22. The process according to claim 21, wherein the backing layer is embossed by an embossing roll.

23. A process for producing the rear-projection screen according to claim 1, wherein a molding composition comprising scattering particles is coextruded with a molding composition which comprises no, or only a very small amount of, scattering particles.

24. The rear-projection screen according to claim 1, wherein the backing layer does not comprise the scattering particles and is transparent.

25. The rear-projection screen according to claim 1, wherein the backing layer is embossed by an embossing roll.

26. The rear-projection screen according to claim 1, wherein the yellowing index of the backing layer is less than 2, said yellowing index is measured without the scattering layer.

27. The rear-projection screen according to claim 1, wherein the halved-intensity angle of the backing layer is determined by separating the scattering layer from the rear-projection screen.

* * * * *

UNITED STATES PATENT AND TRADEMARK OFFICE
CERTIFICATE OF CORRECTION

| | | |
|---|---|---|
| PATENT NO. | : 7,602,550 B2 | Page 1 of 1 |
| APPLICATION NO. | : 10/566370 | |
| DATED | : October 13, 2009 | |
| INVENTOR(S) | : Parusel et al. | |

It is certified that error appears in the above-identified patent and that said Letters Patent is hereby corrected as shown below:

On the title page, Item (87), the PCT Information is incorrect. Item (87) should read:

-- (87) PCT Pub. No.: WO 2005/022254

PCT Pub. Date: Mar. 10, 2005 --

Signed and Sealed this
Third Day of May, 2011

David J. Kappos
*Director of the United States Patent and Trademark Office*